(12) United States Patent
Beerens

(10) Patent No.: US 11,054,030 B2
(45) Date of Patent: Jul. 6, 2021

(54) PISTON FOR AN INTERNAL COMBUSTION ENGINE

(71) Applicant: Mahle International GmbH, Stuttgart (DE)

(72) Inventor: Christoph Beerens, Stuttgart (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/821,981

(22) Filed: Mar. 17, 2020

(65) Prior Publication Data
US 2020/0300361 A1    Sep. 24, 2020

(30) Foreign Application Priority Data

Mar. 18, 2019    (DE) .......................... 102019203650.3

(51) Int. Cl.
| | | |
|---|---|---|
| *F02F 3/00* | (2006.01) | |
| *F16J 9/20* | (2006.01) | |
| *F02F 1/00* | (2006.01) | |
| *F16J 9/22* | (2006.01) | |
| *F02F 5/00* | (2006.01) | |
| *F16J 9/08* | (2006.01) | |

(52) U.S. Cl.
CPC .................... *F16J 9/20* (2013.01); *F02F 3/00* (2013.01); *F02F 5/00* (2013.01); *F02F 2001/006* (2013.01); *F16J 9/08* (2013.01); *F16J 9/22* (2013.01)

(58) Field of Classification Search
CPC ........ F02F 3/00; F02F 3/28; F02F 5/00; F16J 9/12; F16J 1/08; F16J 9/064; F16J 9/22
See application file for complete search history.

(56) References Cited

U.S. PATENT DOCUMENTS

| 9,771,891 B2 * | 9/2017 | Scharp | ..................... F01P 3/08 |
| 2017/0122251 A1 * | 5/2017 | Ness | ....................... F16C 7/023 |
| 2017/0328298 A1 * | 11/2017 | Morgan | .................. F02F 1/004 |

(Continued)

FOREIGN PATENT DOCUMENTS

| DE | 3407405 C1 | 9/1985 |
| DE | 19818869 C1 | 10/1999 |

(Continued)

OTHER PUBLICATIONS

English abstract for DE-3407405.
(Continued)

*Primary Examiner* — Long T Tran
(74) *Attorney, Agent, or Firm* — Fishman Stewart PLLC

(57) ABSTRACT

A piston for an internal combustion engine may include a piston head, an encircling fire land, and at least one annular groove structured to receive a piston ring and disposed contiguous to the fire land. The piston may include a first fire land portion having a first axial height h1, a second fire land portion having a second axial height h2, and a third fire land portion having a third axial height h3. The first fire land portion may have an upper external diameter D1. The third fire land portion may have a lower external diameter D3. A transition from the first to the second fire land portion may have a first external diameter D12. A transition from the second to the third fire land portion may have a second external diameter D23. The relationship $(D12-D23)/h2 > (D23-D3)/h3$ may apply.

20 Claims, 3 Drawing Sheets

(56) References Cited

U.S. PATENT DOCUMENTS

2018/0094604 A1* 4/2018 Prstojevic .................. F02F 3/28
2018/0306139 A1* 10/2018 Lormes ..................... F02F 3/02
2019/0024606 A1* 1/2019 Weiss ...................... B23P 15/10
2019/0093596 A1* 3/2019 Dimascio .................. F02F 3/12

FOREIGN PATENT DOCUMENTS

| DE | 102014214673 B3 | 1/2016 |
|---|---|---|
| JP | H06-229315 A | 8/1994 |

OTHER PUBLICATIONS

English abstract for DE-19818869.
English abstract for DE-102014214673.
English abstract for JPH06-229315.

* cited by examiner

PISTON FOR AN INTERNAL COMBUSTION ENGINE

CROSS-REFERENCE TO RELATED APPLICATIONS

This application claims priority to German Patent Application No. DE 10 2019 203 650.3, filed on Mar. 18, 2019, the contents of which are hereby incorporated by reference in their entirety.

TECHNICAL FIELD

The present invention relates to a piston for an internal combustion engine, having a piston head, an encircling fire land, and at least one annular groove which for receiving a piston ring is contiguous to the fire land. The invention furthermore relates to an internal combustion engine having at least one such piston.

BACKGROUND

Pistons of the generic type are well known, wherein an external diameter which increases from a piston head towards a first annular groove is often provided on the fire lands of said pistons, a gap between the fire land and a cylinder wall narrowing from the piston head towards the first annular groove on account of said increasing external diameter. It goes without saying that cylindrical fire lands are also known. It can be achieved by means of conical or cylindrical, respectively, fire lands of this type, for example conjointly also with a comparatively large chamfer at the transition from the fire land to the annular groove, that an ingress of a pressure surge right into the base of the groove is facilitated and a pressure increase in the back of a piston ring is generated on account thereof, and the contact pressure acting on said piston ring is increased. A sealing effect of the piston ring is in particular to be facilitated on account thereof.

A piston for an internal combustion engine having an annular groove which is rectangular in the cross section is known from DE 198 18 169 C1, the upper flank of said annular groove that is contiguous to a fire land widening in the radial outward direction in the manner of a diffuser, that is to say having a comparatively large chamfer. On account thereof, contact between the piston ring and a lower groove flank is to be achieved faster than before, in particular when a pressure surge from a combustion chamber ingresses by way of the fire land into the first annular groove, said piston ring bearing on the lower groove flank for a longer time on account thereof, and an improved thermal transfer from the piston to a cylinder running face being able to be achieved on account thereof. The risk of oil carbonizing in the respective annular groove can additionally also be reduced on account thereof.

A further piston of the generic type for an internal combustion engine is known from DE 34 07 405 C1, said piston in the region of the operating planes which are disposed so as to be offset by 90° to the piston pin axis of said piston having tapers which are intended to prevent the piston head bearing on a cylinder wall.

In a gap of this type which between a fire land and a cylinder wall narrows from a piston head to the first annular groove it is however disadvantageous that the pressure surges flowing into said gap are further amplified. Pressure peaks are in certain circumstances generated by way of said amplified pressure surges, in particular in the case of so-called low speed pre-ignition (LSPI), said pressure peaks potentially increasing the risk of the fire land breaking upwards and thus into a combustion chamber, or of a land situated between the first annular groove and the second annular groove breaking downwards, which has to be avoided at all cost.

SUMMARY

The present invention therefore focuses on the object of providing an improved, or at least an alternative, embodiment for a piston of the generic type, said embodiment to at least minimize in particular a pressure increase below a fire land of the piston and thus the risk of the fire land breaking.

This object is achieved according to the invention by the subject matter of the independent claim(s). Advantageous embodiments are the subject matter of the dependent claim(s).

The present invention is based on the general concept of not reducing a gap which between a cylinder wall and a piston proceeds from a piston head by way of a fire land in the direction of an annular groove which is contiguous to the fire land, and on account thereof causing a pressure increase, but rather of enlarging said gap and at the same type configuring an ideally sharp-edged transition from the fire land into the annular groove, that is to say without a chamfer or with only a minimum chamfer, so as to thus reduce a pressure increase below the fire land. On account of the comparatively tight gap between the cylinder wall and the piston at the piston head, caused by a comparatively minor radial clearance, the entry of a pressure surge from the combustion chamber into the gap between the piston head and the cylinder wall is impeded when a LSPI effect (pre-ignition) arises, wherein the pressure is at the same time reduced on account of the gap which in the manner of a diffuser widens downwards, that is to say in the direction of the annular groove, and any intense increase in pressure in the annular groove can be avoided by virtue of the sharp-edged transition from the fire land into the annular groove. The piston according to the invention herein has a piston head, an encircling fire land, and at least one annular groove which for receiving a piston ring is contiguous to the fire land. According to the invention, a first fire land portion is contiguous to the piston head, while a third fire land portion which is contiguous to the annular groove is provided. The first and the third fire land portion herein are connected by way of a second fire land portion which is disposed therebetween. The first fire land portion has an axial height $h_1$, the second fire land portion has an axial height $h_2$, and the third fire land portion has an axial height $h_3$. Moreover, the first fire land portion has an upper external diameter $D_1$, and the third fire land portion has a lower external diameter $D_3$, wherein the piston at a transition from the first fire land portion to the second fire land portion has an external diameter $D_{12}$, and at a transition from the second fire land portion to the third fire land portion has an external diameter $D_{23}$. According to the invention, it moreover applies that $(D_{12}-D_{23})/h_2 > (D_{23}-D_3)/h_3$.

It can be achieved on account thereof that a gap between the piston and a cylinder wall, proceeding from the first fire land portion increases by way of the second to the third fire land portion. The external diameter herein in the entire first fire land portion is larger than a maximum external diameter in the third fire land portion. On account of the design embodiment of the fire land according to the invention it is possible for the first time to achieve a comparatively minor radial clearance in relation to the cylinder wall in the region of the piston head, and thus to achieve a comparatively minor gap which impedes the entry of a pressure surge when pre-ignition arises. Moreover, a reduction in pressure can be achieved by widening the gap from the first fire land portion in the direction of the third fire land portion, and thus in the direction of the annular groove which is contiguous to the third fire land portion, on account of which the risk of the fire land breaking as well as the risk of a land disposed below the annular groove breaking can be significantly reduced.

According to one advantageous refinement of the solution according to the invention, there is in each case no chamfer or a chamfer having an axial chamfer height $h_F$ of at most 0.5 mm, preferably of at most 0.2 mm, disposed at a transition from the piston head to the first fire land portion and/or from the third fire land portion to the annular groove. On account of the omission of the chamfer, or of the provision of only a very minor chamfer, respectively, at the transition from the third fire land portion into the annular groove, a propagation of pressure into the annular groove is additionally impeded, this likewise reducing the risk of the fire land breaking. On account of the omission of the chamfer, or of the provision of only a very minor chamfer, respectively, at the transition from the piston base to the first fire land portion, a propagation of pressure into the gap between the piston and the cylinder wall is impeded.

In one advantageous refinement of the solution according to the invention, the second fire land portion is configured so as to be conical (in the cross section), wherein the external diameter in the second fire land portion decreases in a consistent or monotonous manner in the direction of the third fire land portion. On account thereof, a consistent increase in the annular gap between the piston and the cylinder wall can be achieved, this contributing towards increasingly reducing the pressure of undesired pressure surges when the latter enter.

In one further advantageous embodiment of the solution according to the invention, the external diameter in the second fire land portion decreases by approx. 0.5 mm, such that $(D_{12}-D_{23}) \approx 0.5$ mm applies. A decrease of this type refers to pistons having an axial height of the fire land of 4.5 mm to 7 mm, preferably approx. 5.25 mm. Petrol engines of this type are usually turbocharged so as to increase the output and reduce the consumption of said petrol engines, on account of which a high torque is to be achieved in particular at low rotating speeds. LSPI (pre-ignition) preferably arises precisely in the case of such turbocharged petrol engines. The exact physical and chemical root causes therefor are as yet unclear, one theory herein claiming that oil droplets make their way into the combustion chamber through gaps between the piston and the cylinder wall, said oil droplets in said combustion chamber mixing with fuel and spontaneously igniting. Another theory claims that deposits are the root cause of the ignition. A significant reduction in pressure can be achieved by reducing the external diameter in the second fire land portion by approx. 0.5 mm, said reduction in pressure at least minimizing the risk of the fire land breaking.

In one further advantageous embodiment of the solution according to the invention, it applies that $h_1+h_3=h_2$. The axial heights $h_1$ and $h_3$ of the first and the third fire land portion thus conjointly correspond to the axial height $h_2$ of the second fire land portion. It can additionally apply here that the first fire land portion has the same axial height $h_1$ as the third fire land portion such that $h_1=h_3$ applies. In the case of this special design embodiment it has been demonstrated that the pressure-reducing effect as well as the prevention of the pressure surge transitioning from the third fire land portion into the annular groove can be optimized.

In one alternative embodiment of the solution according to the invention, the second fire land portion has a step or is a step, wherein the external diameter $D_{23}$ at the transition from the second fire land portion to the third fire land portion decreases in a stepped/abrupt manner. The step herein can run radially in relation to the piston axis or run so as to be slightly inclined in relation to the latter. An abrupt reduction in the pressure when pressure surges enter from the combustion chamber can be achieved in the region of the second fire land portion on account of a reduction of the external diameter in the second fire land portion in such a stepped manner.

In one alternative embodiment of the piston according to the invention, the second fire land portion is configured in the manner of a curve, wherein the external diameter of the second fire land portion decreases in the direction of the third fire land portion in a curved and consistent and monotonous manner, but at variable intensities when viewed across the axial height. The external diameter thus decreases in a consistent and monotonous manner from $D_{12}$ to $D_{23}$. The first fire land portion herein possesses an axial height $h_1$, while the second fire land portion possesses an axial height $h_2$, and the third fire land portion possesses an axial height $h_3$, and wherein it applies that $h_1+h_3=h_2$ and $h_1=h_3$. The first and the third fire land portion thus possess identically sized axial heights $h_1$, $h_3$, which individually is in each case half the size of the axial height $h_2$ of the second fire land portion. On account thereof, a cylindrical portion of the third fire land portion which achieves the sharp-edged transition to the annular groove can in particular be provided.

It can advantageously be provided that the first fire land portion is configured so as to be cylindrical that is to say that $D_1=D_{12}$, or the upper external diameter $D_1$ decreases in a consistent and/or monotonous manner in the direction of the external diameter $D_{12}$ at the transition to the second fire land portion. Additionally or alternatively, it can also be provided that the third fire land portion is configured so as to be cylindrical, that is to say that $D_{23}=D_3$, or the external diameter $D_{23}$ decreases in a consistent and/or monotonous manner in the direction of the annular groove. On account thereof, a piston which in particular is cylindrical in the first and/or third fire land portion and is thus simple to produce can be achieved. "Consistent" in the application is to be understood as being without jumps (but may include ups and downs), and "monotonous" is to be understood as being without counter inclines but optionally with cylindrical portions, thus not necessarily "strictly monotonous", or even with jumps. Purely theoretically, the first and the third fire land portion can also be configured so as to be conical, bulged, or trumpet-shaped, or a combination thereof. Only the second fire land portion is not cylindrical in any case.

The present invention is furthermore based on the general concept of specifying an internal combustion engine having a cylinder as well as a piston disposed in said cylinder, corresponding to the previous paragraphs, on account of which the internal combustion engine according to the invention can be significantly improved in terms of the effect of pre-ignition and the associated risk of the fire land breaking. The third fire land portion herein can have a spacing $a_3$ of 0.69 mm from the cylinder wall of the cylinder, while the first fire land portion has a spacing $a_1$ of 0.44 mm. the cross-sectional reduction is thus 0.5 mm, that is to say that the reduction in radii is 0.25 mm. This refers in particular to pistons of comparatively small petrol engines, having an axial height of the fire land of approx. 5 mm. The LSPI effects arise markedly in particular in the case of these turbocharged petrol engines, such that the invention has a particular benefit in this case.

Further important features and advantages of the invention are derived from the dependent claims, from the drawings, and from the associated description of the figures by means of the drawings.

It goes without saying that features mentioned above and yet to be explained hereunder can be used not only in the respective combination stated, but also in other combinations or individually, without departing from the scope of the present invention.

Preferred exemplary embodiments of the invention are illustrated in the drawings and will be explained in more detail in the description hereunder, wherein identical reference signs refer to identical or similar or functionally equivalent components.

BRIEF DESCRIPTION OF THE DRAWINGS

In the drawings, in each case in a schematic manner.

DETAILED DESCRIPTION

Figure 1:
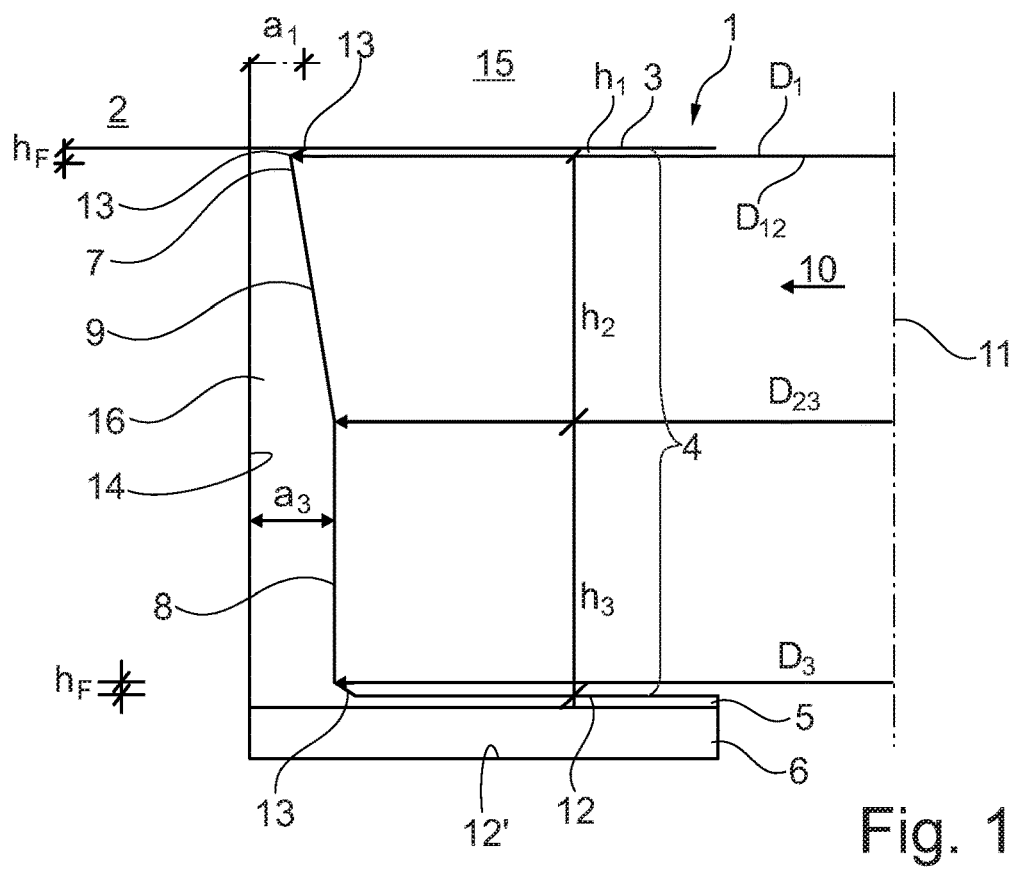
FIG. 1 shows a sectional illustration through an internal combustion engine according to the invention, having a piston according to the invention, corresponding to a first embodiment.

Corresponding to FIGS. 1 to 6, a piston 1 according to the invention for an internal combustion engine 2 has a piston head 3, an encircling fire land 4, as well as at least one annular groove 5 which for receiving a piston ring 6 is contiguous to the fire land 4. Provided according to the invention are now a first fire land portion 7 which is contiguous to the piston head 3, a third fire land portion 8 which is contiguous to the annular groove 5, as well as a second fire land portion 9 which connects the two fire land portions 7, 8 and is disposed therebetween. The annular groove 5 possesses groove flanks 12, 12' which preferably run in parallel and in the radial direction 10 in relation to the piston axis 11, specifically one piston-head-proximal groove flank 12 and one piston-head-distal groove flank 12'. The first fire land portion 7 has an axial height $h_1$, the second fire land portion 9 has an axial height $h_2$, and the third fire land portion 8 has an axial height $h_3$. The first fire land portion 7 possesses an upper external diameter $D_1$, and the third fire land portion 8 possesses a lower external diameter $D_3$, wherein the piston 1 at the transition from the first fire land portion 7 to the second fire land portion 9 has an external diameter $D_{12}$, and at the transition from the second fire land portion 9 to the third fire land portion 8 has an external diameter $D_{23}$. It now applies according to the invention that:
$(D_{12}-D_{23})/h_2 > (D_{23}-D_3)/h_3$.

In other words, this means that the first fire land portion 7 has a larger external diameter than the third fire land portion 8, and the second fire land portion 9 in terms of the external diameter thereof decreases from $D_{12}$ to $D_{23}$. The decrease is performed in a consistent manner (cf. FIGS. 1, 2, as well as 5 and 6) or in a stepped manner (cf. FIGS. 3 and 4), wherein the third fire land portion 8 can be configured so as to be cylindrical and thus to have an external diameter $D_{23}=D_3$. In the region of the third fire land portion 8, the external diameter $D_{23}$ can alternatively also decrease in a consistent and/or monotonous manner in the direction of the annular groove 5.

At the transition from the piston head 3 to the first fire land portion 7 and/or from the third fire land portion 8 to the annular groove 5, no chamfer 13 or a chamfer 13 having an axial chamfer height $h_F$ of at most 0.5 mm, preferably of at most 0.2 mm, can in each case be disposed. The chamfer height $h_F$ herein is a component part of the axial height $h_1$ or $h_3$. On account thereof, a comparatively sharp transition from the piston head 3 to the first fire land portion 7, or from the third fire land portion 8 into the annular groove 5, respectively, can be achieved.

By way of the fire land 4 configured according to the invention it is possible for a spacing $a_1$ between the piston 1 in the region of the piston head 3 thereof, or of the first fire land portion 7, respectively, and a cylinder wall 14 to be kept comparatively small, on account of which the invasion of a pressure surge from a combustion chamber 15 into a gap 16 between the cylinder wall 14 and the fire land 4 is at least impeded. A type of diffuser by way of which a pressure level of a pressure surge invading the gap 16 from the combustion chamber 15 can be reduced, can be achieved on account of the spacing a of the fire land 4 from the cylinder wall 14, said spacing a increasing in the direction of the third fire land portion 8, and thus on account of a reduction in the external diameter D. Moreover, an invasion of the pressure surge into the annular groove 5 can be impeded on account of the comparatively sharp transition from the third fire land portion 8 into the piston-head-proximal groove flank 12 of the annular groove 5, on account of which the risk of the fire land 4 breaking can be significantly reduced.

Figure 2:
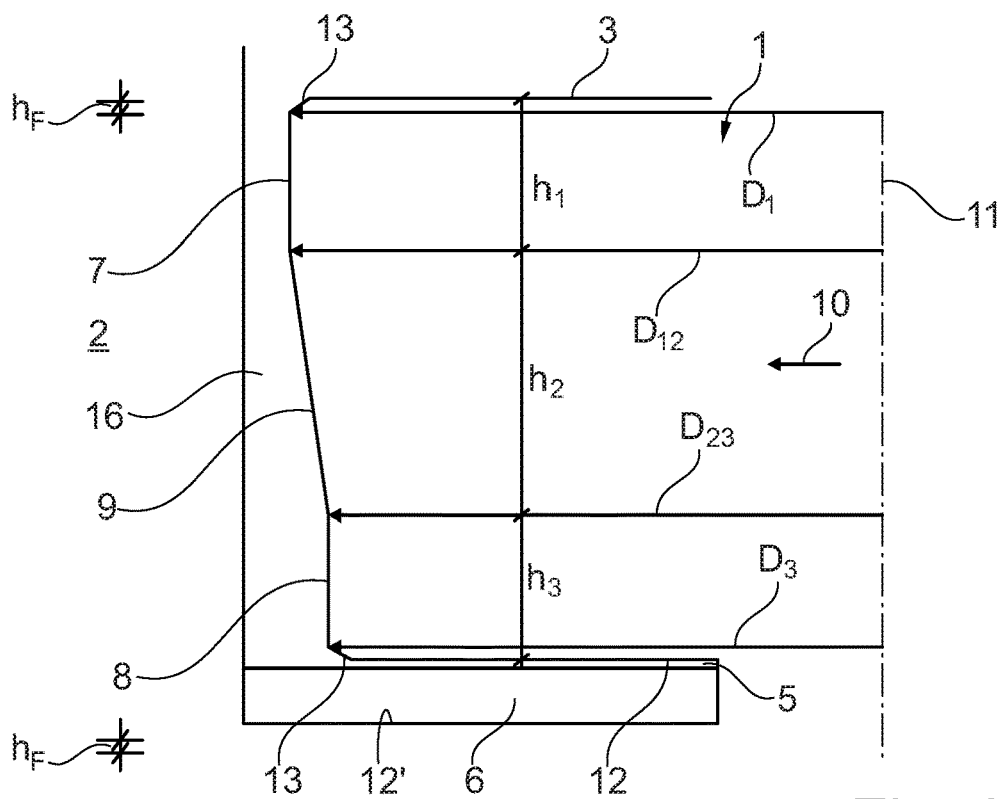
FIG. 2 shows a sectional illustration through an internal combustion engine according to the invention, having a piston according to the invention, corresponding to a second embodiment.

According to FIGS. 1 and 2, the second fire land portion 9 herein is configured so as to be conical, wherein the external diameter in the second fire land portion 9, proceeding from $D_{12}$ in the direction of the third fire land portion 8, decreases in a consistent or monotonous manner in the direction $D_{23}$. The external diameter D herein is always determined in the manner proceeding from a piston axis 11 in the radial direction 10, and is provided with an index number in a manner analogous to the associated fire land portion 7, 8, 9.

The first fire land portion 7 can be configured so as to be cylindrical, that is to say that $D_1=D_{12}$, or the upper external diameter $D_1$ can decrease in a consistent and/or monotonous manner in the direction of the external diameter $D_{12}$ at the transition to the second fire land portion 9. Overall, the external diameter in the second fire land portion herein can be decreased by approx. 0.5 mm, on account of which a gap widening $\Delta a = a_3 - a_1 = 0.25$ mm can be achieved. These dimensions apply in particular to pistons 1 having an axial overall height of the fire land 4 of approx. 5 mm.

Furthermore observing FIGS. 1 to 6, it can be seen that the first fire land portion 7 has an axial height $h_1$, the second fire land portion 9 has an axial height $h_2$, and the third fire land portion 8 has an axial height $h_3$, wherein it applies according to FIG. 1 that the sum of the axial heights $h_1$ and $h_2$ of the first and the second fire land portion 7, 9 corresponds approximately to the axial height $h_3$ of the third fire land portion 8. By contrast, in the piston 1 illustrated according to FIG. 2 the axial height $h_1$ of the first fire land portion 7 is significantly greater and corresponds substantially to the axial height $h_3$ of the third fire land portion 8, wherein it applies that the sum of the two axial heights $h_1$ and $h_3$ of the first and the third fire land portion 7, 8 corresponds approximately to the axial height $h_2$ of the second fire land portion 9. It thus applies that $h_1+h_3=h_2$, wherein it applies that $h_1=h_3$.

Figure 3:
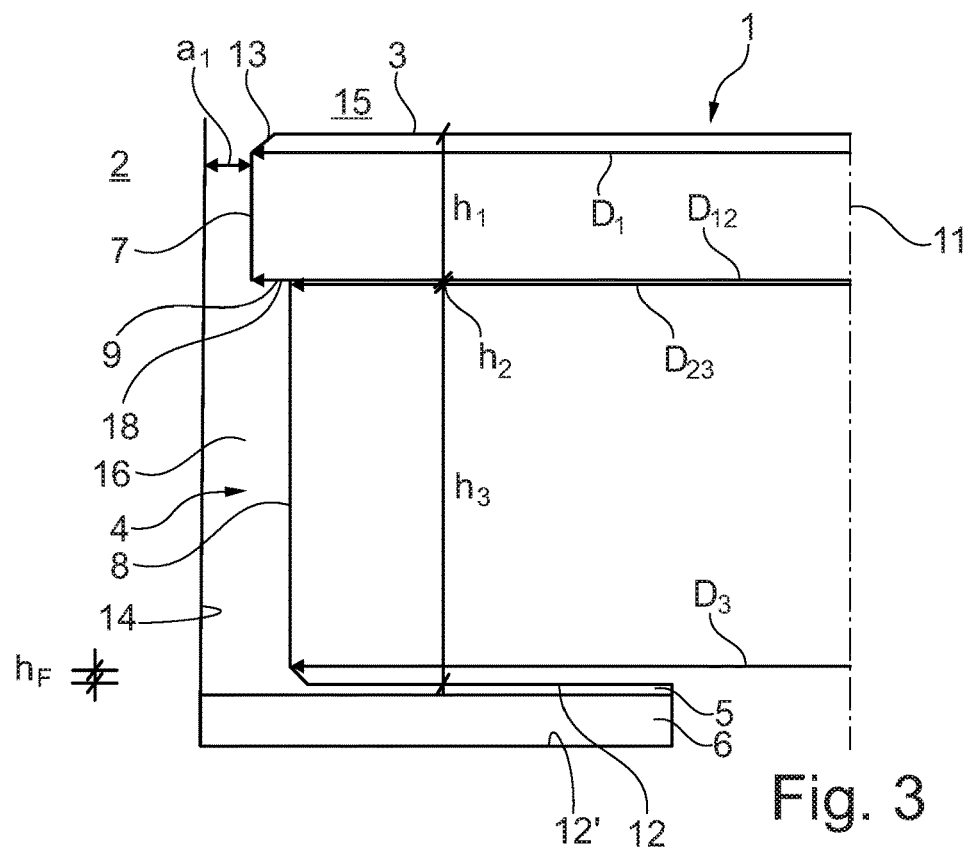
FIG. 3 shows a sectional illustration through an internal combustion engine according to the invention, having a piston according to the invention, corresponding to a third embodiment.
Figure 4:
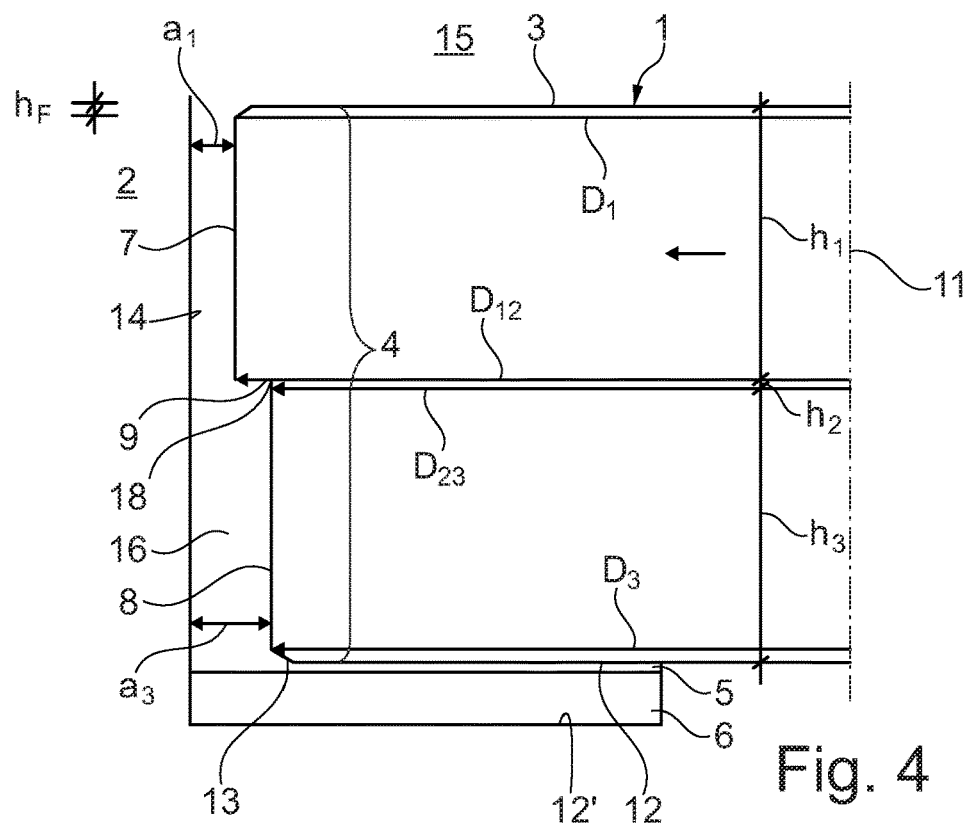
FIG. 4 shows a sectional illustration through an internal combustion engine according to the invention, having a piston according to the invention, corresponding to a fourth embodiment.

According to FIGS. 3 and 4, the second fire land portion 9 is configured as a step 18, or possesses a step 18 of this type, respectively, wherein the external diameter $D_{12}$ to $D_{23}$, at the transition of the second fire land portion 9 to the third fire land portion 8, decreases in the manner of a step, that is to say in an inconsistent or abrupt manner, respectively. It can apply herein, for example, that the axial height $h_3$ of the third fire land portion 8 is approximately three times the axial height $h_1$ of the first fire land portion 7 (cf. FIG. 3) so that $h_3=3h_1$ applies.

Alternatively, it is also conceivable that the axial height $h_1$ of the first fire land portion 7 corresponds to approximately the axial height $h_3$ of the third fire land portion 8, such that the following formula applies in this case: $h_3=h_1$ or $h_3 \approx h_1$. In the case of a step-type transition in the second fire land portion 9, the latter possesses an axial height $h_2$ which is close to zero. Therefore, the external diameter $D_{12}$ and the external diameter $D_{23}$ are drawn from above and below in FIGS. 3, 4.

Figure 5:
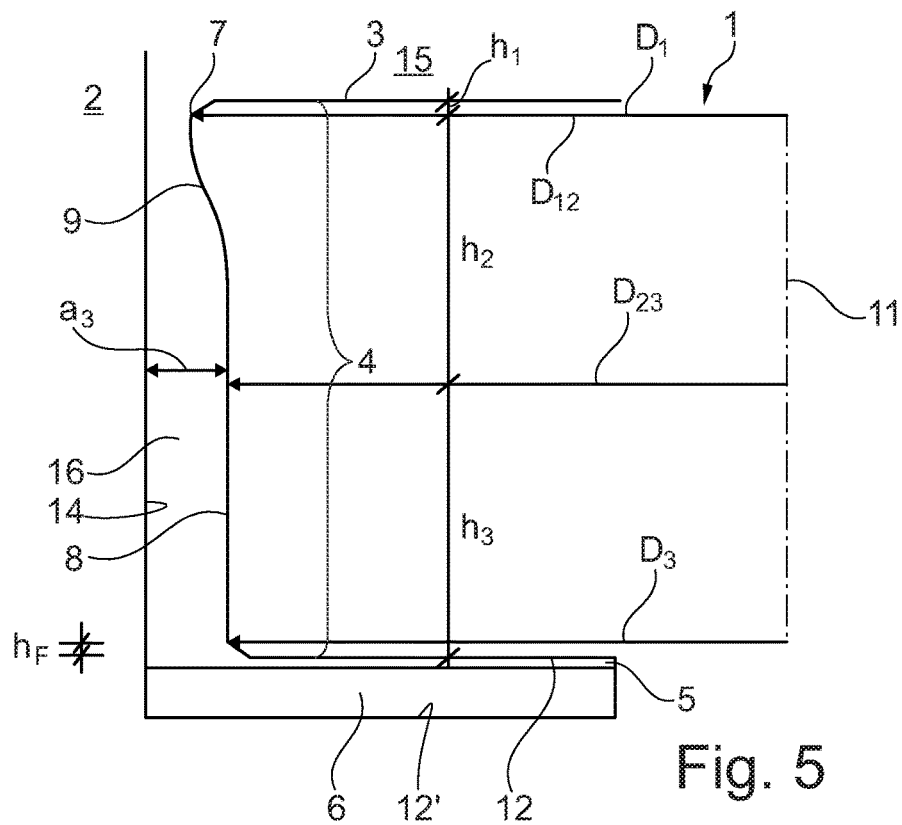
FIG. 5 shows a sectional illustration through an internal combustion engine according to the invention, having a piston according to the invention, corresponding to a fifth embodiment.
Figure 6:
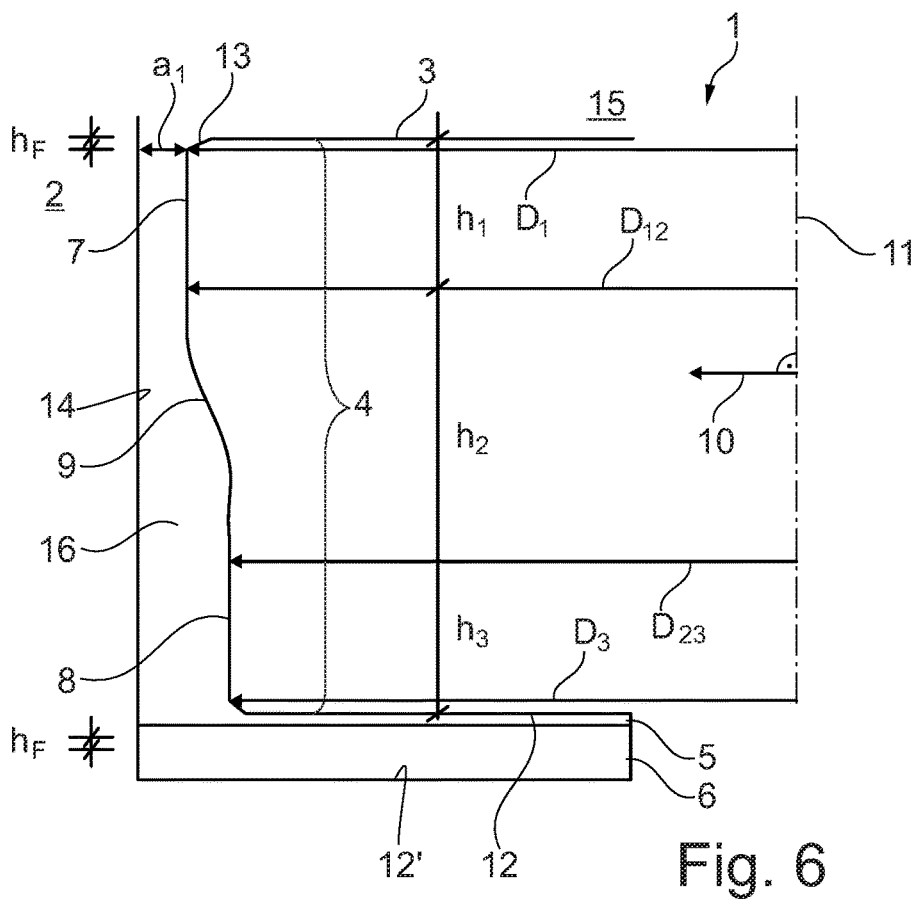
FIG. 6 shows a sectional illustration through an internal combustion engine according to the invention, having a piston according to the invention, corresponding to a sixth embodiment.

Observing the embodiments of the piston 1 according to the invention according to FIGS. 5 and 6, it can be seen therein that the second fire land portion 9 is configured in the manner of a curve, wherein the external diameter decreases in a consistent and monotonous but not conical manner from $D_{12}$ to $D_{23}$. "Conical" herein of course refers to the cross-sectional shape of the second fire land portion 9. In the case of the embodiment illustrated according to FIG. 5, it applies, for example, that $h_2=h_3$, while in the case of the embodiment illustrated according to FIG. 6, it applies that: $h_1+h_3=h_2$ and $h_1=h_3$. The sum of the axial heights $h_1+h_2+h_3$ in the case of a piston 1 according to the invention can be approx. 5.25 mm.

At a transition from the piston head 3 to the first fire land portion 7 and/or from the third fire land portion 8 to the annular groove 5, no chamfer 13 or a chamfer 13 having an axial chamfer height $h_F$ of at most 0.5 mm, preferably of at most 0.2 mm, can in each case be disposed.

By way of the piston 1 according to the invention, and thus also by way of the internal combustion engine 2 according to the invention, it is possible to keep a comparatively small spacing $a_1$ between a cylinder wall 14 of the internal combustion engine 2 and the piston 1 in the region of the piston head 3, or in the region of the first fire land portion 7, respectively, on account of which the invasion of a pressure surge into the gap 16 is impeded, in particular in the case of pre-ignition.

On account of the gap width (spacing $a_3$) of the gap 16 which widens in the direction of the third fire land portion 8, a reduction in the pressure level can moreover be achieved, wherein an invasion of the pressure surge into the annular groove 5 can be impeded and the risk of the fire land 4 breaking can be thus reduced at the same time on account of the third fire land portion 8, which is designed in the manner of a cylinder, and the sharp-edged transition from the third fire land portion 8 into the annular groove 5. Overall, negative effects of low speed pre-ignition (LSPI) can be significantly reduced on account thereof.

The invention claimed is:

1. A piston for an internal combustion engine, comprising:
   a piston head, an encircling fire land, and at least one annular groove structured to receive a piston ring, the at least one annular groove disposed contiguous to the fire land;
   a first fire land portion disposed contiguous to the piston head, a second fire land portion, and a third fire land portion disposed contiguous to the at least one annular groove, the second fire land portion disposed between and connecting the first fire land portion and the third fire land portions;
   the first fire land portion having a first axial height h1, the second fire land portion having a second axial height h2, and the third fire land portion having a third axial height h3;
   the first fire land portion having an upper external diameter D1, and the third fire land portion having a lower external diameter D3;
   wherein a transition from the first fire land portion to the second fire land portion has a first external diameter D12, and a transition from the second fire land portion to the third fire land portion has a second external diameter D23; and
   wherein (D12−D23)/h2>(D23−D3)/h3.

2. The piston according to claim 1, wherein the second fire land portion is conical and has an external diameter that decreases in a consistent manner in a direction of the third fire land portion.

3. The piston according to claim 2, wherein (D12−D23) ≈0.5 mm.

4. The piston according to one claim 1, further comprising a chamfer having an axial chamfer height hF of 0.5 mm or less, the chamfer disposed at one of (i) a transition from the piston head to the first fire land portion and (ii) a transition from the third fire land portion to the at least one annular groove.

5. The piston according to claim 4, wherein h1=h3.

6. The piston according to claim 1, wherein h1+h3=h2.

7. The piston according to claim 1, wherein:
   the second fire land portion includes a step; and
   the second external diameter D23 at the transition from the second fire land portion to the third fire land portion decreases in a stepped manner.

8. The piston according to claim 7, wherein h3=3h1.

9. The piston according to claim 7, wherein h3=h1.

10. The piston according to claim 1, wherein the second fire land portion is curved and has an external diameter that decreases in a consistent and monotonous manner from the first external diameter D12 to the second external diameter D23.

11. The piston according to claim 10, wherein h1+h3=h2 and h1=h3.

12. The piston according to claim 1, wherein h1+h2+h3=5.25 mm.

13. The piston according to claim 1, wherein the at least one annular groove includes a piston-head-proximal groove flank and a piston-head-distal groove flank, and wherein the piston-head-proximal groove flank and the piston-head-distal groove flank extend parallel to a radial direction.

14. The piston according to claim 1, wherein the first fire land portion is structured cylindrical such that D1=D12.

15. The piston according to claim 1, wherein the third fire land portion is structured cylindrical such that D23=D3.

16. The piston according to claim 1, wherein (i) a transition from the piston heat to the first fire land portion, and (ii) a transition from the third fire land portion to the at least one annular groove are each structured without a chamfer.

17. The piston according to claim 1, further comprising:
a first chamfer having an axial chamfer height hF of 0.2 mm or less disposed at a transition from the piston head to the first fire land portion; and
a second chamfer having an axial chamfer height hF of 0.2 mm or less disposed at a transition from the third fire land portion to the at least one annular groove.

18. The piston according to claim 1, wherein the upper external diameter D1 decreases in a consistent manner in a direction of the external diameter D12 at the transition from the first fire land portion to the second fire land portion.

19. The piston according to claim 1, wherein the external diameter D23 decreases in a consistent manner in a direction of the at least one annular groove.

20. An internal combustion engine, comprising a cylinder and a piston disposed in the cylinder, the piston including:
a piston head, an encircling fire land, and at least one annular groove structured to receive a piston ring and disposed contiguous to the fire land;
a first fire land portion disposed contiguous to the piston head, a second fire land portion, and a third fire land portion disposed contiguous to the at least one annular groove, the second fire land portion disposed between and connecting the first fire land portion and the third fire land portion;
the first fire land portion having a first axial height h1, the second fire land portion having a second axial height h2, and the third fire land portion having a third axial height h3;
the first fire land portion having an upper external diameter D1, and the third fire land portion having a lower external diameter D3;
wherein a transition from the first fire land portion to the second fire land portion has a first external diameter D12, and a transition from the second fire land portion to the third fire land portion has a second external diameter D23, and
wherein (D12−D23)/h2>(D23−D3)/h3.

* * * * *